United States Patent Office 3,313,632
Patented Apr. 11, 1967

3,313,632
GOLD-SILVER COORDINATION COMPOUNDS
AND DECORATING COMPOSITIONS CONTAINING SAME
Robert C. Langley, Millington, and Howard M. Fitch, Summit, N.J., assignors to Engelhard Industries, Inc., Newark, N.J., a corporation of Delaware
No Drawing. Filed Nov. 27, 1962, Ser. No. 240,426
9 Claims. (Cl. 106—1)

This invention relates to precious metal decorating compositions and more particularly to new and improved decorating compositions, method for decorating with such compositions, and to novel coordination compounds well suited for use as a constituent of such decorating compositions.

Gold decorating compositions containing gold sulforesinates are known to the art and have been described, for example, by Boudnikoff, Compt. rend., 196, 1898 (1933), and by Chemnitius, J. Prakt. Chem. 117, 245 (1927). The gold sulforesinates are prepared by reacting a gold salt with a sulfurized terpene such as sulfurized Venetian turpentine. Silver sulforesinates are prepared in a similar manner by reacting a silver salt with a sulfurized terpene. Decorating compositions containing mixtures of gold and silver sulforesinates in varying proportions are known and have been described, for example, by Zsigmondy, U.S. Patent 682,310, and by Chemnitius, Sprechsaal, 60, 313 (1927). Chemnitius has also described burnish gold decorating compositions containing mixtures of gold sulforesinate, gold powder, and silver benzoate. The decorating of articles with these prior art decorating compositions has involved the firing of the compositions, after application to the article, at high temperatures, ranging from 500° C. up to 800° C. and higher depending on the article or substrate being decorated, to deposit a precious metal film. Consequently the article being decorated had to be of a refractory material or a material of good thermal stability to withstand the high temperatures of the firing, and articles of a non-refractory material or of low thermal stability, for instance of paper, wood, leather, cellulosic and synthetic textiles, and plastics and plastic laminates of the thermoplastic type could not be fired at the high temperatures for the reason they were destroyed or decomposed at the high firing temperatures. Further the prior art mixtures containing gold sulforesinate and silver benzoate are unstable and immediately precipitate metallic silver due to reduction of the silver benzoate.

The decorating compositions of the present invention are an improvement over the decorating compositions of the prior art previously mentioned herein, and are particularly meritorious in enabling the firing decoration of materials or articles of low thermal stability and non-refractory in character without destruction or deterioration of the non-refractory material. The decorating composition comprises a coordination compound of a gold mercaptide with an equimolar proportion of a silver compound from the group consisting of silver carboxylates and silver mercaptides, and a vehicle for the coordination compound. In addition to enabling the firing decoration of the non-refractory materials at considerably lower temperatures than required by the prior art compositions and without heat damaging these materials, the decorating compositions of this invention are more stable that the prior art mixtures and eliminate the undesirable precipitation of metallic silver. Further, the coordination compounds exhibit a desirable synergism in decorating compositions in certain important respects over use of either of the components separately of the coordination compounds. Thus the coordination compounds show a materially better solubility in organic solvents than either component of the coordination compound separately or in physical admixture, and the decorating compositions containing the coordination compounds also show a materially better covering power over decorating compositions containing either of the components of the coordination compound separately or as a mixture. The decorating compositions containing the coordination compounds of this invention fire to films which are a golden yellow in appearance, and are virtually indistinguishable in appearance from films of pure gold. This enables the formation of gold films at a lower cost by substituting relatively inexpensive silver for a portion of the gold normally present in such films. While the reasons for the behavior of the coordination compounds of this invention are not entirely understood, it is evident that the coordination results in an interaction of the components during the firing that is not obtained with the uncoordinated mixtures of the prior art.

The coordination compounds of this invention have the general formula RSAu·Y, where Y is R'SAg or R"COOAg and R, R' and R" are alkyl, esterified carboxyalkyl, alkoxyalkyl, alicyclic, aryl, aralkyl, alkaryl or terpenyl radicals. They are prepared by reacting one molar proportion of a gold mercaptide with one molar proportion of a silver carboxylate or silver mercaptide, preferably in a solvent such as the vehicle to be used in the decorating composition, with heating of the reactants to temperature in the range of 50° C.–120° C. when one or both of the reactants have limited solubility in organic solvents which is typically the situation. The heating is essential for this reaction inasmuch as in the absence of the heating, the reaction is not completed within practicable time limits and may require as long as a week and even longer for completion. In those situations when both reactants have good solubility in organic solvents, heating may not be necessary to complete the reaction and the reaction may be completed at room temperature. Temperatures much higher than 120° C. are to be avoided due to the low thermal stabilities of the coordination compounds. Generally speaking, it is preferable that one of the reactants be soluble to the extent of five percent or more by weight in organic solvents, such as the vehicle of the decorating compositions of this invention and hereinafter disclosed. It is a meritorious feature of this invention that usually the solubility of the coordination compound in the organic solvents will approach that of the more soluble component, and this is the situation even when the less soluble component has no, or negligible, solubility. This is of merit in that it permits the use of relatively insoluble compounds, for instance gold ethyl mercaptide or silver 2-ethyl hexoate, that are ordinarily too insoluble for use in decorating compositions designed to give a bright metallic film without burnishing.

The coordination compounds of this invention may contain from about 2–60 carbon atoms in the molecule, preferably from about 6–40 carbons per molecule. In the general formula RSAu·Y where Y is R'SAg or R"COOAg and R, R' and R" are alkyl, esterified carboxyalkyl, alkoxyalkyl, alicyclic, aralkyl, alkaryl or terpenyl radicals, exemplary of the alkyl radicals are 1–20 carbon alkyl radicals, of the esterified carboxyalkyl radicals are those with the carboxy group esterified with the alkyl radical from aliphatic alcohols and with the alkyl of the carboxyalkyl containing from 1–20 carbons; exemplary of the alkoxyalkyl radicals are those wherein each alkyl contains from 1–20 carbons, and exemplary of the alicyclic radicals are cyclohexyl and naphthenyl radicals. Exemplary of aryl radicals are phenyl, naphthyl and anthryl radicals, of aralkyl radicals are phenyl, naphthyl and anthryl in the aryl portion and 1–20 carban alkyl in the alkyl portion, of alkaryl radicals are 1–20 carbon alkyl in the alkyl portion and phenyl, naphthyl and anthryl in the aryl portion, and of terpenyl radicals are pinanyl and menthyl radicals.

Although it is usually neither necessary nor desirable to isolate or purify the coordination compound and it can be prepared in one or more of the vehicles to be used in the decorating composition, if desired, the coordination compounds of the invention may be isolated by evaporation of the solvent in which they were prepared. Most of them are obtained as amorphous or resinous solids, but a few can be isolated as well characterized crystalline solids. For example, when equimolar proportions of gold sec.-butyl mercaptide and silver tert.-butyl mercaptide are stirred at about 110° C. in the minimal amount of toluene required to give a clear solution, crystals of the gold sec.-butyl mercaptide-silver tert.-butyl mercaptide coordination compound precipitate on cooling and can be recrystallized from toluene without change in composition. The white crystals thus obtained decompose without showing any sharp melting point in a capillary melting point tube at temperatures of 178° C. and higher.

Gold mercaptides suitable for combining with silver carboxylates or silver mercaptides to form the coordination compounds of the invention include gold mercaptides of primary, secondary and tertiary mercaptans which may be aliphatic, alicyclic, aryl, alkaryl, aralkyl or terpenyl in structure. Examples of specific gold mercaptides that give with silver carboxylates or silver mercaptides equimolar coordination compounds suitable for use in decorating compositions of this invention are gold ethyl mercaptide, gold n-propyl mercaptide, gold isopropyl mercaptide, gold n-butyl mercaptide, gold isobutyl mercaptide, gold sec.-butyl mercaptide, gold tert.-butyl mercaptide, gold n-amyl mercaptide, gold isoamyl mercaptide, gold n-hexyl mercaptide, gold n-heptyl mercaptide, gold n-octyl mercaptide, gold tert.-octyl mercaptide, gold 2-ethylhexyl mercaptide, gold n-decyl mercaptide, gold n-dodecyl mercaptide, gold tert.-dodecyl mercaptide, gold tert.-hexadecyl mercaptide, gold n-octadecyl mercaptide, the ethyl ester of gold carboxymethyl mercaptide, the isooctyl ester of gold carboxymethyl mercaptide, the 2-methoxyethyl ester of gold carboxymethyl mercaptide, gold 2-methoxyethyl mercaptide, gold 4-ethoxybutyl mercaptide, gold cyclohexyl mercaptide, gold benzyl mercaptide, gold alpha-methylbenzyl mercaptide, gold 2-phenylethyl mercaptide, gold mixed cresyl mercaptides, gold mixed xylyl mercaptides, gold p-tert.-butylphenyl mercaptide, gold p-nonylphenyl mercaptide, gold p-tert.-butyl-o-methylphenyl mercaptide, gold pinene mercaptide and gold 1-methyl mercaptide. Generally speaking, the best results were obtained with coordination compounds prepared from the gold primary and secondary alkyl or aralkyl mercaptides. Pure gold mercaptides are not essential to the practice of the invention, and mixtures of gold mercaptides may be employed to give mixtures of coordination compounds.

Silver mercaptides suitable for combining with gold mercaptides to form the coordination compounds of the invention include silver mercaptides of primary, secondary and tertiary mercaptans which may be aliphatic, alicyclic, aryl, alkaryl, aralkyl or terpenyl in structure. Examples of specific silver mercaptides that give with gold mercaptides equimolar coordination compounds suitable for use in decorating compositions include silver ethyl mercaptide, silver isopropyl mercaptide, silver n-butyl mercaptide, silver isobutyl mercaptide, silver sec.-butyl mercaptide, silver tert.-butyl mercaptide, silver 2-ethylhexyl mercaptide, silver tert.-nonyl mercaptide, silver n-dodecyl mercaptide, silver n-octadecyl mercaptide, the ethyl ester of silver carboxymethyl mercaptide, the isooctyl ester of silver carboxymethyl mercaptide, the tert.-dodecyl ester of silver carboxymethyl mercaptide, silver 2-methoxyethyl mercaptide, silver 4-ethoxybutyl mercaptide, silver cyclohexyl mercaptide, silver alpha-methylbenzyl mercaptide, silver 2-phenylethyl mercaptide, silver p-tert.-butylphenyl mercaptide, silver pinene mercaptide and silver 1-menthyl mercaptide. Particularly good results were obtained with coordination compounds prepared from the isooctyl ester of silver carboxymethyl mercaptide, prepared by reacting a silver salt with isooctylthioglycolate. Pure silver mercaptides are not essential to the practice of the invention, and mixtures of silver mercaptides may be employed to give mixtures of coordination compounds.

Silver carboxylates suitable for combining with gold mercaptides to form the coordination compounds of the invention include silver carboxylates of aliphatic, alicyclic, aryl, alkaryl, aralkyl and terpenyl carboxylic acids. Examples of specific carboxylates that give with gold mercaptides equimolar coordination compounds suitable for use in decorating compositions include silver butyrate, silver 2-ethylhexoate, silver 10-undecenoate, silver stearate, silver S-tert.-dodecyl-thioglycolate, silver oleate, silver p-tert.-butylbenzoate, silver hydrocinnamate, silver phenylacetate, silver diphenylacetate, silver methoxyacetate, silver 3-ethoxybutyrate, silver hexahydrobenzoate, silver camphorate, silver ethylsuccinate, silver naphthenate and silver hydrogenated rosinate. Particularly good results were obtained with coordination compounds prepared from silver naphthenate. Pure silver carboxylates are not essential to the practice of the invention, and mixtures of silver carboxylates may be employed to give mixtures of coordination compounds.

Examples of coordination compounds suitable for use as constituents of decorating compositions of this invention are listed below. In each case the coordination compound was prepared from equimolar quantities of the named gold and silver compounds, and a hyphen is used to denote coordinate bonding. For convenience and brevity, the terms gold (or silver) ethyl, isooctyl, tert.-dodecyl and 2-methoxyethyl thioglycolate are used to refer to the ethyl, isooctyl, tert.-dodecyl and 2-methoxyethyl esters of gold (or silver) carboxymethyl mercaptide respectively. In each case, it is to be understood that the alkyl group is attached as an esterifying group to the carboxy group and the metal is attached as a mercaptide to the mercaptan sulfur of thioglycolic acid.

Gold ethyl mercaptide-silver alpha-methylbenzyl mercaptide
Gold ethyl mercaptide-silver tert.-nonyl mercaptide
Gold ethyl mercaptide-silver isooctyl thioglycolate
Gold ethyl mercaptide-silver naphthenate
Gold n-propyl mercaptide-silver naphthenate
Gold isopropyl mercaptide-silver naphthenate
Gold n-butyl mercaptide-silver isooctyl thioglycolate
Gold n-butyl mercaptide-silver 1-menthyl mercaptide
Gold n-butyl mercaptide-silver hydrogenated rosinate
Gold isobutyl mercaptide-silver n-butyl mercaptide
Gold isobutyl mercaptide-silver isobutyl mercaptide
Gold isobutyl mercaptide-silver sec.-butyl mercaptide
Gold isobutyl mercaptide-silver tert.-butyl mercaptide
Gold isobutyl mercaptide-silver cyclohexyl mercaptide
Gold isobutyl mercaptide-silver 2-ethylhexyl mercaptide
Gold isobutyl mercaptide-silver isooctyl thioglycolate
Gold isobutyl mercaptide-silver p-tert.-butylphenyl mercaptide
Gold isobutyl mercaptide-silver pinene mercaptide
Gold isobutyl mercaptide-silver n-dodecyl mercaptide
Gold isobutyl mercaptide-silver naphthenate
Gold isobutyl mercaptide-silver hydrogenated rosinate
Gold sec.-butyl mercaptide-silver n-butyl mercaptide
Gold sec.-butyl mercaptide-silver isobutyl mercaptide
Gold sec.-butyl mercaptide-silver sec.-butyl mercaptide
Gold sec.-butyl mercaptide-silver tert.-butyl mercaptide
Gold sec.-butyl mercaptide-silver cyclohexyl mercaptide
Gold sec.-butyl mercaptide-silver 2-ethylhexyl mercaptide Gold sec.-butyl mercaptide-silver 2-phenylethyl mercaptide
Gold sec.-butyl mercaptide-silver isooctyl thioglycolate
Gold sec.-butyl mercaptide-silver 1-menthyl mercaptide
Gold sec.-butyl mercaptide-silver p-tert.-butylphenyl mercaptide
Gold sec.-butyl mercaptide-silver pinene mercaptide
Gold sec.-butyl mercaptide-silver n-dodecyl mercaptide
Gold sec.-butyl mercaptide-silver tert.-dodecyl thioglycolate
Gold sec.-butyl mercaptide-silver naphthenate
Gold sec.-butyl mercaptide-silver hydrogenated rosinate
Gold tert.-butyl mercaptide-silver isooctyl thioglycolate
Gold tert.-butyl mercaptide-silver 1-menthyl mercaptide
Gold tert.-butyl mercaptide-silver naphthenate
Gold tert.-butyl mercaptide-silver hydrogenated rosinate
Gold n-amyl mercaptide-silver naphthenate
Gold isoamyl mercaptide-silver naphthenate
Gold n-hexyl mercaptide-silver naphthenate
Gold n-heptyl mercaptide-silver naphthenate
Gold n-octyl mercaptide-silver naphthenate
Gold tert.-octyl mercaptide-silver isooctyl thioglycolate
Gold tert.-octyl mercaptide-silver naphthenate
Gold 2-ethylhexyl mercaptide-silver naphthenate
Gold n-decyl mercaptide-silver naphthenate
Gold n-dodecyl mercaptide-silver naphthenate
Gold tert.-dodecyl mercaptide-silver isooctyl thioglycolate
Gold tert.-hexadecyl mercaptide-silver naphthenate
Gold n-octadecyl mercaptide-silver naphthenate
Gold ethyl thioglycolate-silver isooctyl thioglycolate
Gold isooctyl thioglycolate-silver naphthenate
Gold 2-methoxyethyl thioglycolate-silver isooctyl thioglycolate
Gold 2-methoxyethyl mercaptide-silver naphthenate
Gold 4-ethoxybutyl mercaptide-silver naphthenate
Gold cyclohexyl mercaptide-silver stearate
Gold cyclohexyl mercaptide-silver naphthenate
Gold benzyl mercaptide-silver naphthenate
Gold alpha-methylbenzyl mercaptide-silver ethyl mercaptide
Gold alpha-methylbenzyl mercaptide-silver isopropyl mercaptide
Gold alpha-methylbenzyl mercaptide-silver n-butyl mercaptide
Gold alpha-methylbenzyl mercaptide-silver isobutyl mercaptide
Gold alpha-methylbenzyl mercaptide-silver sec.-butyl mercaptide
Gold alpha-methylbenzyl mercaptide-silver tert.-butyl mercaptide
Gold alpha-methylbenzyl mercaptide-silver 2-ethylhexyl mercaptide
Gold alpha-methylbenzyl mercaptide-silver n-dodecyl mercaptide
Gold alpha-methylbenzyl mercaptide-silver n-octadecyl mercaptide
Gold alpha-methylbenzyl mercaptide-silver ethyl thioglycolate
Gold alpha-methylbenzyl mercaptide-silver isooctyl thioglycolate
Gold alpha-methylbenzyl mercaptide-silver 2-methoxyethyl mercaptide
Gold alpha-methylbenzyl mercaptide-silver 4-ethoxybutyl mercaptide
Gold alpha-methylbenzyl mercaptide-silver cyclohexyl mercaptide
Gold alpha-methylbenzyl mercaptide-silver alpha-methylbenzyl mercaptide
Gold alpha-methylbenzyl mercaptide-silver 2-phenylethyl mercaptide
Gold alpha-methylbenzyl mercaptide-silver p-tert.-butylphenyl mercaptide
Gold alpha-methylbenzyl mercaptide-silver pinene mercaptide
Gold alpha-methylbenzyl mercaptide-silver 1-menthyl mercaptide
Gold alpha-methylbenzyl mercaptide-silver butyrate
Gold alpha-methylbenzyl mercaptide-silver 10-undecenoate
Gold alpha-methylbenzyl mercaptide-silver 2-ethylhexoate
Gold alpha-methylbenzyl mercaptide-silver oleate
Gold alpha-methylbenzyl mercaptide-silver p-tert.-butylbenzoate
Gold alpha-methylbenzyl mercaptide-silver hydrocinnamate
Gold alpha-methylbenzyl mercaptide-silver phenylacetate
Gold alpha-methylbenzyl mercaptide-silver diphenylacetate
Gold alpha-methylbenzyl mercaptide-silver S-tert.-dodecyl thioglycolate
Gold alpha-methylbenzyl mercaptide-silver methoxyacetate
Gold alpha-methylbenzyl mercaptide-silver 3-ethoxybutyrate
Gold alpha-methylbenzyl mercaptide-silver hexahydrobenzoate
Gold alpha-methylbenzyl mercaptide-silver camphorate
Gold alpha-methylbenzyl mercaptide-silver ethylsuccinate
Gold alpha-methylbenzyl mercaptide-silver naphthenate
Gold 2-phenylethyl mercaptide-silver naphthenate
Gold mixed cresyl mercaptides-silver isooctyl thioglycolate
Gold mixed xylyl mercaptide-silver isooctyl thioglycolate
Gold p-tert.-butylphenyl mercaptide-silver naphthenate
Gold p-nonylphenyl mercaptide-silver naphthenate
Gold p-tert.-butyl-o-methylphenyl mercaptide-silver n-butyl mercaptide
Gold p-tert.-butyl-o-methylphenyl mercaptide-silver isobutyl mercaptide
Gold p-tert.-butyl-o-methylphenyl mercaptide-silver sec.-butyl mercaptide
Gold p-tert.-butyl-o-methylphenyl mercaptide-silver tert.-butyl mercaptide
Gold pinene mercaptide-silver ethyl mercaptide
Gold pinene mercaptide-silver naphthenate
Gold 1-menthyl mercaptide-silver naphthenate The coordination compounds of the invention fire to metallic films at temperatures materially below the firing temperatures required to obtain metallic films from the mixtures of the prior art. This is particularly meritorious in that it permits the formation of golden metallic films on non-refractory substrates or substrates of low thermal stability as previously mentioned herein, such as wood, paper, textiles, for instance those formed of animal, e.g. wool, vegetable, e.g. cotton or synthetic fibers, e.g. polyester fibers, or blends of the synthetic fibers with the animal or vegetable fibers, leather and plastics and plastic laminates of the thermoplastic type that would be damaged by the higher temperatures required for the mixtures of the prior art. The ability to form a metallic film at relatively low temperatures is a distinct advantage even in applications on relatively refractory materials where it may be desirable to heat the material to the point of incipient softening, which may vary from about 500° C. for a soft glass to about 800° C. for a ceramic glaze and even higher for more refractory materials to improve the adherence of the metallic film. The initial formation of the metallic film takes place in an oxidizing atmosphere for prompt and complete removal of the organic matter from the film. This oxidizing atmosphere is usually provided by good ventilation of the oven or kiln in which the metallic film is produced, and such ventilation becomes increasingly difficult and costly with increases in temperature, since heat is lost to the air introduced by ventilation. Once the metallic film has been developed, further heating may be accomplished without good ventilation and subsequent heat loss.

In addition to firing to metallic films at low temperatures, considerably lower than the firing temperatures required for the prior art compositions, many of the coordination compounds of the invention fire to metallic films at temperatures considerably below those required to obtain metallic films from the individual components, and hence also evidence a synergistic action in this respect. As examples of this behavior, solutions or suspensions of the following equimolar coordination compounds in toluene were brushed on glass slides:

Gold isobutyl mercaptide-silver isooctyl thioglycolate
Gold isobutyl mercaptide-silver naphthenate
Gold sec.-butyl mercaptide-silver 2-phenylethyl mercaptide
Gold sec.-butyl mercaptide-silver isooctyl thioglycolate
Gold sec.-butyl mercaptide-silver naphthenate
Gold tert.-butyl mercaptide-silver isooctyl thioglycolate
Gold isoamyl mercaptide-silver naphthenate
Gold alpha-methylbenzyl mercaptide-silver isopropyl mercaptide
Gold alpha-methylbenzyl mercaptide-silver n-butyl mercaptide
Gold alpha-methylbenzyl mercaptide-silver sec.-butyl mercaptide
Gold alpha-methylbenzyl mercaptide-silver n-dodecyl mercaptide
Gold alpha-methylbenzyl mercaptide-silver ethyl thioglycolate
Gold alpha-methylbenzyl mercaptide-silver isooctyl thioglycolate The slides were then fired for one hour at 150° C. in a mechanical convection oven. In every case metallic golden films were obtained that were good conductors of electricity. When the individual components, i.e. gold isobutyl mercaptide, gold sec.-butyl mercaptide, gold tert.-butyl mercaptide, gold isoamyl mercaptide, gold alpha-methylbenzyl mercaptide, silver isopropyl mercaptide, silver n-butyl mercaptide, silver sec.-butyl mercaptide, silver n-dodecyl mercaptide, silver 2-phenylethyl mercaptide, silver ethyl thioglycolate, silver isooctyl thioglycolate and silver naphthenate, were separately brushed on glass slides and fired in an identical manner and at the same temperature, none of the films obtained were metallic or conductive, and such films would have to be fired at much higher temperatures than 150° C. to obtain metallic or conductive films.

The decorating compositions of the invention are compositions that form a metallic film when applied to various surfaces and heated. While the decorative effect is an outstanding property of the metallic film produced, such films inherently possess other useful properties such as a high degree of reflectivity to light, making them useful as reflectors and mirrors, and reflectivity to infrared radiation, making them useful as reflectors for lamps, ovens and the like and to protect materials exposed to high temperatures; electrical conductivity, making them useful in forming printed circuits, resistors and capacitors and as bases for soldering connections to nonconducting materials, for electroplating and for plating by dipping in molten metals and alloys; and mechanical strength, making them useful in forming vacuum tight glass to metal seals and the like. In speaking of decoration and decorating compositions, it is intended to include the other useful properties inherent in the metal films produced.

The choice of vehicle controls the behavior of the composition before firing and is dictated by the method by which the composition is to be applied. In addition to simple solvents, the vehicle may include mixtures of essential oils, terpenes, resins and the like carefully chosen to impart specific physical properties to the composition. These properties, such as oiliness, viscosity, evaporation rate, surface tension and tack, will vary for different methods of application, such as brushing, spraying, stippling, stamping, printing, both direct and offset, hot or cold screen printing, stenciling, decalcomania transfer, and the like. Typical vehicles include mixtures of two or more of the following ingredients: methylethyl ketone, cyclohexanone, ethyl acetate, amyl acetate, Cellosolve, butanol, nitrobenzene, toluene, xylene, petroleum ether, chloroform, carbon tetrachloride, various terpenes, such as pinene, dipentene, dipentene oxide, terpineol and the like, essential oils such as oils of lavender, rosemary, aniseed, sassafras, wintergreen, fennel and turpentine, Assyrian asphalt, various rosins and balsams, and synthetic resins.

For decorating compositions designed for firing at temperatures within the range of about 90–250° C. on non-refractory substrates such as paper, wood, leather, textiles, plastics of the thermoplastic type and the like, a flux is not necessary and is undesirable, since it contributes nothing to the continuity and adherence of the fired film and tends to raise the temperature required for firing and to detract from the appearance of the fired film. Accordingly, flux-free decorating compositions are particularly preferred for firing at temperatures of 250° C. and lower. For such low firing compositions, good adherence may be achieved if needed by incorporating a lacquer in the decorating composition or by coating the fired film with lacquer or varnish or by an overlay of plastic laminated to the surface.

For decorating compositions designed for firing at temperatures of 300° C. and above on refractory substrates such as glass, ceramics, stainless steel, mica, quartz and the like, a flux is desirable. The choice of ingredients for the flux determines the behavior of the film during and after firing and is usually dictated by the composition of the article to be decorated and the use for which it is intended. When a specular film is desired, the flux may consist of small amounts of salts or resinates of rhodium or iridium to improve the continuity and brilliance of the metallic film formed on firing the decorating composition. When a film having maximum adherence and abrasion resistance is desired, other ingredients such as salts and resinates of bismuth, chromium, lead cadmium, tin, copper, cobalt, antimony and uranium are employed as fluxing agents. The latter ingredients usually fuse to a low melting glass or glaze during the firing and may be employed with or without rhodium or iridium compounds depending upon whether or not a specular film is desired. While, as has been previously pointed out, the coordination compounds of the invention may advantageously be prepared in one or more of the vehicles to be used in the decorating composition, it should be emphasized that when a fluxed composition is to be prepared, the gold-silver coordination compound must be prepared prior to the addition of the flux, since the latter interferes with the formation of the gold-silver coordination compound.

The gold-silver coordination compounds of this invention may also be employed in decorating compositions containing other precious metals such as platinum or palladium. Platinum or palladium sulforesinates or other soluble compounds of platinum or palladium as well as platinum or palladium powder may be included in decorating compositions containing the gold-silver coordination compounds of the invention to obtain specific colors or electrical properties in the metallic films obtained on firing.

The quantity of gold-silver coordination compound employed in a decorating composition may vary widely, depending upon the method of application and the effect desired. A composition to be applied by spraying to give a nonconductive luster color on firing may contain as little as 0.1 percent gold and an equimolar proportion of silver. A composition to be applied by screening or machine banding to give a highly conductive golden film may contain 16 percent or more of gold and an equimolar proportion of silver. It is an advantage of the gold-silver coordination compounds of this invention that they give opaque films with a rich golden appearance at gold concentrations substantially lower than those required in decorating compositions containing gold alone or the mixtures of the prior art.

The particular firing temperatures employed will depend upon the nature of the article or substrate being decorated and the type of film desired. With the substrates of relatively low thermal stability, the firing temperature will be held as low as possible consistent with the development of a metallic film and preferably within the range of about 90° C.–250° C. For instance with paper, the firing temperature of the applied decorating composition is typically within the range of about 90° C.–150° C.; with wood the firing temperature is typically within the range of about 90° C.–130° C.; with leather the firing temperature is typically within the range of about 90° C.–130° C.; with textiles, for instance those formed of vegetable fibers cellulosic in character, e.g. cotton, the firing temperature is typically between about 90° C. and about 140° C., with textiles formed of animal fibers protein in character, e.g. wool, the firing temperature is typically between about 90° C. and about 130° C.; with synthetic textiles, for instance those of polyester fibers, e.g. a polyethylene terephthalate, the firing temperature is typically between about 90° C. and about 130° C.; and with textiles of blends of polyester fibers and animal or vegetable fibers, e.g. a polyethylene terephthalate and wool or cotton, the firing temperature is typically between about 90° C. and about 130° C. With plastics of the thermoplastic type, for instance acrylic plastics or resins, e.g. the thermoplastic polymers or copolymers of the methyl or ethyl esters of acrylic acid or methacrylic acid, polyethylene or polypropylene, the firing temperature is typically between about 90° C. and 125° C. When the low firing temperatures are required within the range of about 90° C.–250° C., heating by infrared radiation is particularly advantageous since the formation of a metallic film provides a heat-reflecting surface that tends to prevent overheating. For refractory substrates, for instance of glass, glazed ceramics, or porcelain, temperatures within the range of about 500°–900° C. are required to fuse the flux and obtain maximum adherence of the metallic film.

In the examples that follow, where kiln firing is specified it is to be understood that the pieces were placed at ambient temperature in a kiln which was then heated to a specified temperature, maintained at this temperature for a specified period of time known as the soak period and cooled, the total operation requiring an hour or more. Where lehr firing is specified, the pieces were passed through a continuous lehr during one hour and twenty-five minutes, the lehr being heated so that the pieces are slowly heated to a specified temperature, maintained at this temperature for about 10 minutes and slowly cooled. In the examples, parts and percentages are by weight and temperatures are in degrees centigrade.

The invention will be further illustrated by reference to the following specific examples:

*Example 1.—Decorating composition containing gold ethyl mercaptide-silver naphthenate*

A mixture of 156 parts gold ethyl mercaptide, 200 parts silver naphthenate and 3204 parts high flash point naphtha was stirred while heating to 70° during 10 minutes and stirred at about 70° for 30 minutes to give a clear, dark purple solution of gold ethyl mercaptide-silver naphthenate coordination compound containing 3.34 percent gold and 1.83 percent silver that set to a moderately stiff gel on cooling to room temperature. This was applied as a decorative design by screening through a 196 mesh Nitex screen onto a white melamine plastic panel, a piece of decalcomania paper and a piece of a melamine impregnated alpha-cellulose paper of the type used for overlay decoration of melamine dinnerware. When the melamine panel was heated by a 375 watt infrared lamp at a distance of 4.5 inches for 5 minutes, the design appeared as a bright golden film, and the melamine panel was not damaged by the heating. When the decalcomania paper was heated by a 250 watt infrared lamp at a distance of 3 inches for 10 minutes, the design appeared as a bright golden film, and the paper was not damaged by the heating. When the alpha-cellulose paper was heated in the same manner, the design appeared as an attractive matte golden film without damage to the paper.

As an example of a potted electronic circuit obtained from gold ethyl mercaptide-silver naphthenate coordination compound, a mixture of 50 parts gold ethyl mercaptide, 65 parts silver naphthenate and 2060 parts toluene was boiled for one hour under reflux to obtain a toluene solution of gold ethyl mercaptide-silver naphthenate coordination compound. This solution was heated at about 100° in an open dish on a steam bath until most of the toluene had evaporated, leaving about 117 parts of dark paste. The paste was applied by screening in the design of an electronic circuit onto a glass panel, which was heated on a hot plate having a surface temperature of about 230°. After about 5 minutes, the applied design had been converted to an electrically conductive, metallic film. Thin strips of aluminum foil were placed in contact with the circuit design at various points, a second glass panel coated on one side with an acrylic resin and heated on the same hot plate was placed over the first panel with the coated side in contact with the electronic circuit, and the assembly was allowed to cool under a pressure of about 4 pounds per square inch. There was thus obtained a permanently encapsulated electronic circuit with the strips of aluminum foil serving as conductive leads to the circuit. By applying an electronic current to the leads, the elements of the circuit functioned as resistors or capacitors depending upon whether a continuous or discontinuous electrical circuit was provided by the design.

*Example 2.—Decorating composition containing gold n-butyl mercaptide-silver naphthenate*

A mixture of 572 parts gold n-butyl mercaptide and 676 parts silver naphthenate in 8,300 parts carbon tetrachloride was stirred for one hour at 60–65°. Enough additional carbon tetrachloride was added to replace that lost by evaporation and give a total of 8,602 parts carbon tetrachloride. A viscous amber solution was obtained that set to a stiff gel on cooling. Fifty-four parts were diluted with 27 parts toluene to give a screening composition containing 2.67 percent Au and 1.46 percent Ag. This was printed through a 304 mesh screen onto decalcomania paper. On heating under an infrared lamp, a bright golden film was obtained without damage to the paper. The decalcomania was completed in the usual way by an overprint of lacquer, and the golden design could be readily transferred to any desired substrate by the usual technique of wetting the paper and sliding off the lacquer film carrying the design. The screening composition was also applied to a melamine dish, giving a bright golden film without damage to the dish on heating for 10 minutes under an infrared lamp.

*Example 3.—Decorating composition containing gold alpha-methylbenzyl mercaptide-silver ethyl mercaptide*

A mixture of 667 parts gold alpha-methylbenzyl mercaptide and 341 parts silver ethyl mercaptide in 7,500 parts chloroform was stirred at room temperature for 4 hours. Little or no reaction occurred. The mixture was then stirred and warmed to 50° during 1 hour and was stirred at about 50° for one-half hour. The reaction was now substantially complete, and the solution was filtered from a trace of insoluble material. Evaporation of the clear yellow filtrate at room temperature left 1,011 parts of the equimolar coordination compound, gold alpha-methylbenzyl mercaptide-silver ethyl mercaptide, as a yellow, resinous solid. One part of this coordination compound was stirred with 6 parts acrylic resin, 6 parts ethyl acetate and 100 parts chloroform to give a clear yellow solution containing 0.35 percent Au and 0.19 percent Ag. When this was applied to a soda lime glass slide and heated at about 150° for 90 minutes, an adherent film with an attractive deep purple color was obtained.

*Example 4.—Decorating compositions containing gold isobutyl mercaptide-silver isooctyl thioglycolate*

A. A mixture of 400 parts gold isobutyl mercaptide, 698 parts of a toluene solution of silver isooctyl thioglycolate containing 21.51 percent silver, and 620 parts toluene was stirred for 90 minutes at room temperature. The reaction was not complete and was completed by stirring the mixture at about 50° for 30 minutes. After adding toluene to replace the loss by evaporation, 1718 parts of a clear yellow solution of gold isobutyl mercaptide-silver isooctyl thioglycolate was obtained containing 16 percent gold and 8.76 percent silver. This was applied by brushing onto a dark green acrylic plastic visor designed for protection of the eyes from intense radiation. On heating for 10 minutes 5 inches away from a 250 watt infrared bulb, a bright golden film was obtained on the coated portion of the visor without damage to the plastic. This film substantially reduced transmission of infrared and visible energy through the visor.

B. A somewhat less concentrated decorating composition was prepared by diluting 25 parts of the composition of A above with 5 parts xylene, 5 parts ethyl acetate and 5 parts chloroform to give a clear yellow solution containing 10 percent gold and 5.475 percent silver. This was applied by brushing onto a wide variety of substrates, and the test pieces were heated at a distance of 4.5 inches by a 250 watt infrared lamp for the periods of time noted in Table I below. In every case, bright golden films were obtained on the substrates.

TABLE I.—SUBSTRATES DECORATED WITH A DECORATING COMPOSITION CONTAINING GOLD ISOBUTYL MERCAPTIDE-SILVER ISOOCTYL THIOGLYCOLATE

| Substrate: | Minutes heated |
|---|---|
| Acrylic plastic visor | 10 |
| Phenolic resin paper laminate panel | 10 |
| Melamine plastic disk | 10 |
| Epoxy resin fiberglass laminate | 15 |
| Natural hard black rubber panel | 20 |
| Polyamide plastic ("Nylon") thin sheet | 60 |
| Polypropylene plastic panel | 30 |
| White pine wooden block | 10 |
| Black enameled carbon steel jar lid | 2 |
| White enameled carbon steel jar lid | 7 |
| Brass panel | 20 |
| Chlorinated polyether plastic (green "Penton") panel | 5 |
| Fluorohalocarbon plastic ("Aclar 22C") thin sheet | 10 |
| Fluorohalocarbon plastic ("Aclar 33C") thin sheet | 15 |
| Ethyl cellulose plastic thin sheet | 7 |
| Silicone plastic fiberglass laminate panel | 5 |
| Polyethylene terephthalate plastic ("Mylar") thin sheet | 4 |
| Cellulose acetate plastic thin sheet | 5 |
| Type 302 stainless steel wall tile | 5 |

The same composition was brushed onto a bottle made of linear polyethylene. On heating the coated portion of the bottle for about 4 seconds in the flame of a Bunsen burner, a bright golden film was obtained.

The same composition was brushed onto a soda lime clear glass panel, which was heated for seven hours on a hot plate having a surface temperature about 90°. A bright golden film resulted.

The same composition was brushed onto a swatch of woven fiberglass cloth, which was heated by a 6000 watt infrared heater at a distance of 7 inches for 10 minutes. A dark golden coating resulted that was a good conductor of electricity.

The same composition was brushed onto a thin sheet of a fluorinated ethylene-propylene plastic ("Teflon FEP"), which was heated by a 6000 watt infrared heater at a distance of 7 inches for 20 seconds. A semi-bright golden film resulted that was bright when viewed from the reverse side.

C. As an example of a fluxed decorating composition containing gold isobutyl mercaptide-silver isooctyl thioglycolate for high temperature firing on refractory substrates, a mixture of 100 parts of the composition of A above, 14 parts of a solution of bismuth resinate in a mixture of essential oils (4.5 percent Bi), 4 parts of a solution of chromium resinate in a mixture of cyclohexanone and oil of turpentine (2.05 percent Cr) and 2 parts of a solution of rhodium sulforesinate in a mixture of essential oils and hydrocarbons (5 percent Rh) was prepared. The resulting clear solution containing 13.33 percent gold and 7.30 percent silver was brushed onto a glazed ceramic tile, which was fired in a kiln to 650° with a 10 minute soak. An adherent, conductive, matte golden film was obtained that became bright on burnishing and could be soldered.

D. Seventy parts of composition C above were mixed with 50 parts sulfurized balsam to give a decorating composition containing 8 percent gold and 4.38 percent silver. This was applied by brushing onto a variety of refractory substrates, which were fired under conditions suitable for the individual substrates. In every case, conductive golden films were obtained. The substrates, firing conditions and appearance of the fired films are listed below in Table II.

TABLE II.—SUBSTRATES DECORATED WITH A FLUXED DECORATING COMPOSITION CONTAINING GOLD ISOBUTYL MERCAPTIDE-SILVER ISOOCTYL THIOGLYCOLATE

| Substrate | Firing Conditions | Appearance of Film |
|---|---|---|
| Borosilicate opal glass saucer | Kiln to 650°, 10 minute soak. | Bright. |
| Borosilicate clear glass tubing | ----do---- | Do. |
| Fused silica panel | Kiln to 740° 10 minute soak. | Do. |
| Alumina disk | ----do---- | Matte. |
| Soda lime opal glass plate | Lehr to 600° | Bright. |
| Porcelain enameled steel panel | Kiln to 600°, no soak. | Do. |
| Aluminum panel | Kiln to 500°, no soak. | Semi-bright. |
| Porcelain enameled aluminum panel | ----do---- | Do. |
| Titanium metal panel | ----do---- | Do. |
| Soda lime clear glass tumbler | Kiln to 600°, 10 minute soak. | Bright. |
| Hard porcelain dinner plate | Kiln to 800°, 10 minute soak. | Do. |
| Bowl made of a glass ceramic known as Pyroceram. | ----do---- | Matte. |
| Mica disk | Kiln to 500°, no soak. | Bright. |
| Stainless steel panel | ----do---- | Do. |
| Glazed earthenware dish | Kiln to 740°, 10 minute soak. | Do. |

The same composition was brushed onto a silicone plastic fiber glass laminate panel, which was heated by a 9000 watt infrared heater at a distance of 7 inches for 15 minutes. A bright, conductive golden film was obtained.

The same composition was applied by brushing onto an epoxy plastic fiberglass panel, which was heated by a 3000 watt infrared heater at a distance of 7 inches for 3 hours. A bright, non-conductive golden film was obtained.

*Example 5.—Decorating composition containing gold alpha-methylbenzyl mercaptide-silver n-octadecyl mercaptide*

A soluent solution of gold alpha-methylbenzyl mercaptide-silver n-octadecyl mercaptide was prepared by stirring a mixture of 201 parts gold alpha-methylbenzyl mercaptide, 238 parts silver n-octadecyl mercaptide and 2516 parts toluene for 20 minutes at 95° to give a clear yellow solution containing 4.00 percent gold and 2.19 percent silver that set to a stiff gel on cooling to room temperature. A mixture of 10 parts of this solution, 3 parts stearic acid, 3 parts stearone and 3 parts melamine was stirred in an open dish on a steam bath until 8 parts had evaporated and 11 parts remained to give a solid thermoplastic decorating composition containing 3.6 percent gold and 1.97 percent silver. This was applied as a decorative design by screening hot through a 230 mesh Nitex screen heated with an infrared lamp onto a glazed ceramic tile. The applied film immediately became hard and free of tackiness. After firing the tile in a kiln to 350° with a 5 minute soak, the design appeared as a bright, conductive, lemon-gold film.

*Example 6.—Decorating composition containing gold cyclohexyl mercaptide-silver stearate*

A soluent solution of gold cyclohexyl mercaptide-silver stearate was prepared by stirring a mixture of 191 parts gold cyclohexyl mercaptide, 234 parts silver stearate and 2530 parts toluene on a steam bath at about 100° for 15 minutes. The mixture was filtered hot from a trace of insoluble material to give a clear dark amber liquid containing 4.00 percent gold and 2.19 percent silver that set to a gel on cooling to room temperature. Ten parts of this solution was mixed with 3 parts oil of rosemary and 2 parts cedrol and heated in an open dish on a steam bath until 5 parts had evaporated and 10 parts of a decorating composition in screening form remained. This was applied as a decorative design by screening through a 196 mesh Nitex screen onto a glazed ceramic tile, which was fired in a kiln to 300° with a 5 minute soak. The design appeared as a conductive, semi-bright golden film.

*Example 7.—Decorating composition containing gold alpha-methylbenzyl mercaptide-silver p-tert.-butylbenzoate*

A toluene solution of gold alpha-methylbenzyl mercaptide-silver p-tert.-butylbenzoate was prepared by stirring a mixture of 47.2 parts gold alpha-methylbenzyl mercaptide and 40 parts silver p-tert.-butylbenzoate in 2000 parts toluene in an open beaker at 57–65° C. for 15 minutes to obtain 2000 parts of a ruby-red solution containing 1.37 percent gold and 0.75 percent silver. To this solution was added 3 parts of a solution of rhodium resinate in a mixture of essential oils and hydrocarbons (5% Rh), 21 parts of a solution of bismuth resinate in a mixture of essential oils (4.5% Bi), 6 parts of a solution of chromium resinate in a mixture of cyclohexanone and oil of turpentine and 200 parts of a 50% solution of rosin in turpentine. The mixture was stirred in an open dish on a steam bath until 1990 parts had evaporated, leaving 240 parts of a viscous, dark brown oil containing 11.41% gold, 6.17% silver, 0.0625% rhodium, 0.394% bismuth and 0.05% chromium. This decorating composition was applied as a decorative design by stamping with a rubber stamp onto a glazed earthenware dish, which was fired in a kiln to 740° C. with a 10 minute soak. The design appeared as a conductive, matte golden film having good abrasion resistance.

*Example 8.—Decorating composition containing gold n-dodecyl mercaptide-silver naphthenate*

A toluene solution of gold n-dodecyl mercaptide-silver naphthenate was prepared by stirring a mixture of 203 parts silver naphthenate dissolved in 1734 parts toluene and 244 parts gold n-dodecyl mercaptide suspended in 774 parts toluene on a steam bath at about 100° for 3 minutes. A clear, moderately viscous amber solution containing 4.00 percent gold and 2.19 percent silver was obtained from which gelatinous material separated on cooling. A decorating composition was prepared by mixing 10 parts of the hot solution with 1 part rhodium sulforesinate dissolved in a mixture of benzyl acetate and terpineol (1% Rh) and 4 parts oil of rosemary, and the mixture was heated in an open dish on a steam bath until 5 parts had evaporated and 10 parts remained. This was applied by brushing onto a panel of porcelain enameled steel, which was heated briefly on a hot plate to 200° and then fired in a kiln to 350° with no soak. A bright, conductive golden film resulted.

*Example 9.—Decorating composition containing gold isobutyl mercaptide-silver isooctyl thioglycolate and a platinum sulforesinate*

A decorating composition suitable for spray application containing gold isobutyl mercaptide-silver isooctyl thioglycolate and a platinum sulforesinate was prepared by mixing 50 parts of the composition of Example 4–A, 100 parts of a solution of platinum sulforesinate in a mixture of essential oils (12 percent Pt), 7 parts of a solution of bismuth resinate in a mixture of essential oils (4.5 percent Bi), 2 parts of a solution of chromium resinate in a mixture of cyclohexanone and oil of turpentine (2.05 percent Cr), 1 part of a solution of rhodium sulforesinate in a mixture of essential oils and hydrocarbons (5 percent Rh), 50 parts sulfurized balsam and 190 parts toluene. The resulting solution containing 3 percent platinum, 2 percent gold and 1.09 percent silver was applied by spraying onto a glazed earthenware plate, which was kiln fired to 740° with a 10 minute soak. An adherent, conductive bright silvery film was obtained.

*Example 10.—Decorating composition containing gold isobutyl mercaptide-silver isooctyl thioglycolate and a palladium sulforesinate*

A decorating composition suitable for brushing containing gold isobutyl mercaptide-silver isooctyl thioglycolate and a palladium sulforesinate was prepared by mixing 50 parts of the composition of Example 4–A, 50 parts of a solution of palladium sulforesinate in a mixture of essential oils (9 percent Pd), 7 parts of a solution of bismuth sulforesinate in a mixture of essential oils (4.5 percent Bi), 2 parts of a solution of chromium resinate in a mixture of essential oils and oil of turpentine (2.05 percent Cr), 1 part of a solution of rhodium sulforesinate in a mixture of essential oils and hydrocarbons (5 percent Rh), 25 parts sulfurized balsam, 35 parts oil of rosemary and 30 parts toluene. The resulting solution containing 2.25 percent palladium, 4 percent gold and 2.18 percent silver was applied as a decorative design by brushing onto a glazed earthenware plate, which was kiln fired to 740° with a 10 minute soak. The design appeared as an adherent, conductive, bright silvery film.

It will be obvious to those skilled in the art that many modifications may be made within the scope of the present invention without departing from the spirit thereof, and the invention includes all such modification.

What is claimed is:

1. A decorating composition comprising a coordination compound of a gold mercaptide with an equimolar proportion of a silver compound selected from the group consisting of silver carboxylates and silver mercaptides, and an organic vehicle therefor.

2. The decorating composition of claim 1 wherein the gold mercaptide is selected from the group consisting of gold primary and secondary alkyl and aralkyl mercaptides.

3. The decorating composition of claim 2 wherein the silver compound is the isooctyl ester of silver carboxymethyl mercaptide.

4. The decorating composition of claim 2 wherein the silver compound is a silver carboxylate.

5. The decorating composition of claim 4 wherein the silver carboxylate is silver naphthenate.

6. The decorating composition of claim 1 in which the coordination compound has the general formula RSAu·Y wherein Y is selected from the group consisting of R'SAg and R"COOAg, and R, R' and R" are selected from the group consisting of alkyl, esterified carboxyalkyl, alkoxyalkyl, alicyclic, aryl, aralkyl, alkaryl and terpenyl radicals.

7. A decorating composition comprising a coordination compound of a gold mercaptide with an equimolar proportion of a silver compound selected from the group consisting of silver carboxylates and silver mercaptides, a flux for the precious metal, and an organic vehicle for the coordination compound and flux.

8. A coordination compound of a gold mercaptide with an equimolar proportion of a silver compound selected from the group consisting of silver carboxylates and silver mercaptides.

9. A coordination compound of a gold mercaptide selected from the group consisting of gold primary and secondary alkyl and aralkyl mercaptides with an equimolar proportion of a silver carboxylate.

References Cited by the Examiner

UNITED STATES PATENTS

| | | | |
|---|---|---|---|
| 682,310 | 9/1901 | Zsigmondy | 117—125 |
| 2,383,704 | 8/1945 | Ballard | 106—1 |
| 2,762,714 | 9/1956 | Smith et al. | 106—1 |
| 2,994,614 | 8/1961 | Fitch | 106—1 |
| 3,085,909 | 4/1963 | Gagliardi et al. | 117—147 |

FOREIGN PATENTS 465,291  5/1937  Great Britain.

ALEXANDER H. BRODMERKEL, *Primary Examiner.*

MORRIS LIEBMAN, *Examiner.*

D. J. ARNOLD, J. E. CARSON, *Assistant Examiners.*